US007783974B2

(12) United States Patent
Nguyen

(10) Patent No.: US 7,783,974 B2
(45) Date of Patent: Aug. 24, 2010

(54) MULTIMEDIA COMMUNICATION AND PRESENTATION

(75) Inventor: Julien T. Nguyen, Saratoga, CA (US)

(73) Assignee: i2z Technology, LLC, Longview, TX (US)

( * ) Notice: Subject to any disclaimer, the term of this patent is extended or adjusted under 35 U.S.C. 154(b) by 1269 days.

(21) Appl. No.: 10/764,835

(22) Filed: Jan. 26, 2004

(65) Prior Publication Data

US 2004/0222972 A1 Nov. 11, 2004

Related U.S. Application Data

(63) Continuation of application No. 09/053,098, filed on Apr. 1, 1998, now Pat. No. 6,684,211.

(51) Int. Cl.
G06F 17/26 (2006.01)
G06F 17/27 (2006.01)
(52) U.S. Cl. .................. 715/261; 709/204; 709/227
(58) Field of Classification Search .............. 715/534, 715/261; 345/172; 707/10; 709/227, 204
See application file for complete search history.

(56) References Cited

U.S. PATENT DOCUMENTS

| 5,204,947 | A | | 4/1993 | Bernstein et al. | |
|---|---|---|---|---|---|
| 5,499,109 | A | | 3/1996 | Mathur et al. | |
| 5,666,542 | A | | 9/1997 | Katai et al. | |
| 5,680,619 | A | | 10/1997 | Gudmundson et al. | |
| 5,812,126 | A | * | 9/1998 | Richardson et al. | 715/741 |
| 5,826,102 | A | | 10/1998 | Escobar et al. | |
| 5,854,893 | A | * | 12/1998 | Ludwig et al. | 709/204 |
| 5,880,731 | A | * | 3/1999 | Liles et al. | 715/758 |
| 5,956,491 | A | * | 9/1999 | Marks | 709/250 |
| 5,963,217 | A | | 10/1999 | Grayson et al. | |
| 6,064,383 | A | * | 5/2000 | Skelly | 715/758 |
| 6,250,930 | B1 | * | 6/2001 | Mintz | 434/323 |
| 6,484,196 | B1 | * | 11/2002 | Maurille | 709/206 |
| 6,785,708 | B1 | * | 8/2004 | Busey et al. | 709/204 |
| 7,263,526 | B1 | * | 8/2007 | Busey et al. | 1/1 |
| 2005/0080868 | A1 | * | 4/2005 | Malik | 709/207 |
| 2007/0026852 | A1 | * | 2/2007 | Logan et al. | 455/422.1 |

FOREIGN PATENT DOCUMENTS

WO WO 99/50744 A1 10/1999

OTHER PUBLICATIONS

Kurlander et al.; "Comic Chat"; 1996 ACM; pp. 225-236.*
Nardi et al.; "Interaction and Outeraction: Instant Messaging in Action" 2000 ACM; pp. 79-85.*
Rivera et al.;"The Effects Of Emotional Icon On Remote Communication";ACM; 1996; pp. 99-100.*
Adesemowo et al.,"Instant Messaging on Handhelds: An Affective Gesture Approach",SCICSIT, 2005, pp. 244-251.*

(Continued)

Primary Examiner—Doug Hutton
Assistant Examiner—James J Debrow

(57) ABSTRACT

The invention provides a method and system for entry and editing of multimedia objects for communication and presentation, associating multimedia objects with received sequences of keystroke or mouse action abbreviations. When an abbreviation is detected, the abbreviation is replaced with the associated multimedia object. Each multimedia object has editable properties, and each set of multimedia objects can be collected into an ensemble, which itself can have editable properties. One such ensemble property is a "theme," which presents a variant of each multimedia object consistent with the theme.

18 Claims, 2 Drawing Sheets

OTHER PUBLICATIONS

Smith et al.,"Converstion Trees and Threaded Chats", ACM, 2008, pp. 97-105.*

O'Neill et al., "Text Chat in Action", ACM, 2003, pp. 40-49.*

Huang et al. "Multimedia E-Mail: The Evolution Approach Based on Adapters." Software—Practice and Experience, Sep. 1994, pp. 785-800, vol. 24, No. 9, John Wiley & Sons, Ltd.

IBM Corp. "Editing Word Processor Documents." IBM Technical Disclosure Bulletin, Jul. 1997, pp. 187-188, vol. 40, No. 7, IBM Corp.

IBM Corp. "Graphical Command Line." IBM Technical Disclosure Bulletin, Jan. 1990, pp. 313-314, vol. 32, No. 8B, IBM Corp.

McNamara, Paul. "Start-up Novita makes multimedia E-mail a snap." Network World, Dec. 9, 1996, p. 31, vol. 13, issue 50, Network World, Inc.

Ouhyoung et al. "The MOS Multimedia E-mail System." Proceedings of the International Conference on Multimedia Computing and Systems, May 19, 1994, pp. 315-324, IEEE.

Tessier, Tom. "Using JavaScript to Create Interactive Web Pages." Dr. Dobb's Journal on CD-ROM, Mar. 1996, pp. 1-12.

* cited by examiner

MULTIMEDIA COMMUNICATION AND PRESENTATION

CROSS-REFERENCE TO RELATED APPLICATION

This application hereby incorporates by reference and claims benefit of U.S. application Ser. No. 09/053,098, filed on Apr. 1, 1998, now U.S. Pat. No. 6,684,211.

BACKGROUND OF THE INVENTION

1. Field of the Invention

This invention relates to multimedia communication and presentation.

2. Related Art

In computer systems for communicating and presenting data, it is desirable to communicate and present data in a multiplicity of media. Such communication is sometimes called "multimedia communication." For example, these media can include text, sound, pictures, animation, and combinations thereof. One advantage of multimedia communication is that it can more vividly communicate messages to recipients.

One problem in the known art is that multimedia elements comprise significant amounts of data, and are therefore difficult to construct from "scratch" (that is, from basic elements) and difficult to enter into a computer system. This problem is acute for pictures and similar graphical elements, which must generally be "captured" using video equipment. For example, it would be desirable for users to be able to enter picture data into messages for sending, such as when using electronic chat or electronic mail systems. However, known electronic chat systems do not provide this capability, and known electronic mail systems provide only techniques by which pictures that have already been captured using other equipment can be attached to electronic mail messages and transmitted.

Accordingly, it would be advantageous to provide a system in which multimedia elements can easily be entered and modified, especially in real time. This advantage is achieved in a system in which multimedia elements are associated with keystroke or mouse abbreviations so as to be easily entered from a keyboard or mouse, and in which properties of both individual multimedia elements and an ensemble of multimedia elements can be edited to alter the presentation of those multimedia elements.

SUMMARY OF THE INVENTION

The invention provides a system for entry and modification of multimedia elements for communication and presentation. Abbreviations, each comprising a sequence of one or more keystrokes or mouse actions (such as the typed word "flower") are associated with individual multimedia elements (such as a picture of a flower), so that a human operator can enter those multimedia elements using a keyboard or mouse. Each multimedia element has properties (such as size, complexity, or detail), which can be modified once the multimedia element has been entered (such as altering the flower from a relatively smaller picture to a relatively larger picture). The set of individual multimedia elements is collected into an ensemble, which can itself have properties that can be modified. One such property of the ensemble is a "theme," which applies to a plurality of multimedia elements in the ensemble and presents a variant of each multimedia element consistent with the theme (such as representing the flower as a cactus in a "Western" theme, or as a rose in a "Romantic" theme).

In a preferred embodiment, the multimedia editor is included with a communication system for sending and receiving electronic chat and electronic mail messages in real time, and for presenting web documents in a compressed form. Each multimedia element can include text, sound, pictures, animation, program fragments (such as a Java applet, a pointer to a database retrieval engine, or a uniform resource locator, also known as URL), or a combination or compilation thereof. When a sender enters an abbreviation, an associated multimedia element is transmitted as an electronic chat message or constructed for transmission as an electronic mail message; the choice of associated multimedia element can be responsive to a receiver's capability, and can be selected at the receiver dynamically in response to user actions (such as time taken to look at the multimedia element). The sender can also transmit a theme; multimedia objects are presented to the recipient using the sender's theme, or can be overridden to use a different theme. If the multimedia objects associated with the abbreviations are available at the recipient or at a common server, electronic chat messages, electronic mail messages, and web documents can be compressed and transmitted using only the abbreviations.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general purpose processors or special purpose processors adapted to particular process steps and data structures described herein, and that implementation of the process steps and data structures described herein would not require undue experimentation or further invention.

System Elements

Figure 1:
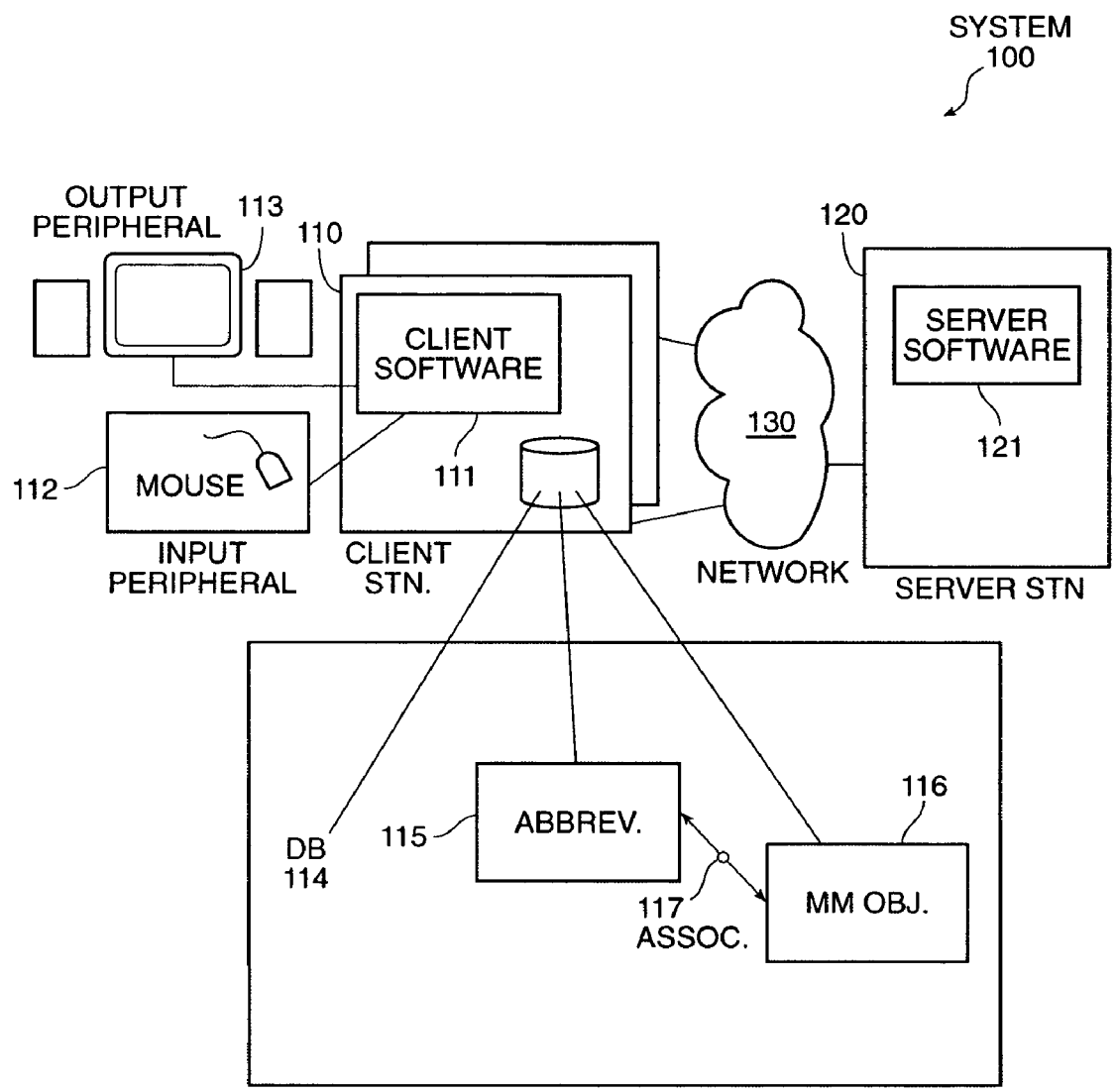
FIG. 1 shows a block diagram of a system for multimedia communication and presentation.

FIG. 1 shows a block diagram of a system for multimedia communication and presentation.

A system 100 includes a plurality of client stations 110, each capable of executing client software 111 such as an electronic chat client or an electronic mail client, and a server station 120, capable of executing server software 121 such as an electronic chat server or an electronic mail server. The client stations 110 and the server station 120 are coupled using a communication network 130.

In a preferred embodiment, the client stations 110 and the server station 120 communicate using a known communication protocol, such as POP (post office protocol) or SMTP (simple mail transfer protocol). The client stations 110 and the server station 120 use the known communication protocol for transmitting electronic mail messages, HTTP (hypertext transfer protocol) for transmitting web documents, and other known communication protocols for transmitting electronic chat messages.

As used herein, the terms "client" and "server" refer to a relationship between the client station and the server station, not necessarily to particular physical devices. As used herein, one "client station" or one "server station" can comprise any of the following: (a) a single physical device capable of executing software which bears a client or server relationship to another station; (b) a portion of a physical device, such as a software process or set of software processes capable of executing on one hardware device, which portion of the physical device bears a client or server relationship to another station; or (c) a plurality of physical devices, or portions thereof, capable of cooperating to form a logical entity which bears a client or server relationship to another station. The phrases "client station" and "server station" refer to such logical entities and not necessarily to particular individual physical devices.

Each client station 110 includes a processor, program and data memory, and mass storage (such as a magnetic or optical disk drive). Each client station 110 includes a set of input peripherals 112, including a character input element (such as a keyboard) and a graphic input element (a pointing device such as a mouse, pen, or trackball), and a set of output peripherals 113, including a visual display element (such as a monitor or printer) and an audio presentation element (such as a set of speakers).

Abbreviations for Multimedia Elements

The mass storage includes a database 114, including a set of abbreviations 115, a set of multimedia objects 116, and a set of associations 117 therebetween.

Each abbreviation 115 includes a selected sequence of keystrokes (such as typed characters) and/or mouse actions (such as left-button clicks, right-button clicks, and double-clicks). In a preferred embodiment, the abbreviations 115 comprise mnemonic names, such as typed words like "flower" to represent a picture of a flower, "foghorn" to represent a sound clip of a foghorn, and the like, but an operator at the client station 110 can also define new abbreviations 115, such as the name of a favorite dog to represent a picture of that dog, even though that name can comprise an arbitrary sequence of characters.

Each multimedia object 116 includes a data element for use with multimedia presentation, such as a text element, an audio element (such as a sound clip in AU or WAV form), a graphical element, a picture element (such as a picture in GIF or JPEG form), or an animation or video element (such as a movie clip in AVI or MPEG form). The multimedia objects 116 can also include data elements such as databases, program fragments (such as Java applets or ActiveX hooks, CGI (common gateway interface) scripts, or a qualified URL), or special document formats (such as a document in Adobe PDF format).

Each association 117 includes a link between an abbreviation 115 and at least one multimedia object 116, so that the client station 110 can detect the abbreviation 115 and locate the multimedia object 116 in response thereto.

When an operator of the client station 110 enters sequences of keystrokes and/or mouse actions, the client station 110 examines the database 114 and determines when one of the abbreviations 115 is entered. When the client station 110 detects a particular abbreviation 115, the client station 110 notes the particular association 117 coupled to that particular abbreviation 115, and determines the (at least one) particular multimedia object 116 associated with that particular abbreviation 115. The client station 110 thereby replaces that particular abbreviation 115 with its associated multimedia object 116.

In the case that there is more than one multimedia object 116 associated with that particular abbreviation 115, the client station 110 can select one of those associated multimedia objects 116 in one of several ways:

The client station 110 can select one of those associated multimedia objects 116 at random.

The client station 110 can select one of those associated multimedia objects 116 on a round-robin basis.

The client station 110 can present two or more of those associated multimedia objects 116 to the operator and ask the operator to select one.

After replacing the abbreviation 115 with its associated multimedia object 116 in the sequence, the client station 110 transmits an altered multimedia sequence (that is, with the replacement having been made) to the server station 120, such as for transmission to a destination client station 110 as an electronic chat message or an electronic mail message. The electronic chat message or electronic mail message thus includes the altered multimedia sequence, some of which has been replaced and some of which has not been replaced. The server station 120 transmits the multimedia sequence to the destination client station 110 using an electronic chat protocol or an electronic mail protocol. The destination client station 110 receives the multimedia sequence and presents the multimedia elements (along with the unreplaced portions of the sequence) to an operator at the destination client station 110.

In a preferred embodiment, the client station 110 can replace a particular abbreviation 115 with a multimedia object 116 comprising a particular program fragment in one of at least two ways:

The client station 110 can insert that program fragment into the multimedia sequence, so that the destination client station 110 receives the program fragment for execution.

The client station 110 can execute that program fragment directly, so that the destination client station 110 receives the multimedia sequence after operation thereupon by the particular program fragment.

In a preferred embodiment, the multimedia objects 116 can be created using multimedia capture and editing software, such as for scanning pictures and editing those pictures, recording sound clips and editing those sound clips, or for creating and/or editing animation sequences.

In a preferred embodiment, the multimedia objects 116 can be located at the client station 110, at the server station 120, or at another device coupled to the network 130 and accessible by either the client station 110 or the server station 120. If located remotely from the client station 110, the multimedia objects 116 can be cached at the client station 110, in the database 114 or otherwise, for use as described herein.

The abbreviations 115 and the associations 117 can be created using a text editor (or similar software for entering and editing information comprising keystrokes), designating the particular sequences of keystrokes and/or mouse actions which comprise the abbreviations 115 and names of those multimedia objects 116 pointed to by their associations 117.

The abbreviations 115 and the associations 117 can also be located at the client station 110, at the server station 120, or at another device coupled to the network 130 and accessible by either the client station 110 or the server station 120. If located remotely from the client station 110, the multimedia objects 116 can be cached at the client station 110, in the database 114 or otherwise, for use as described herein.

Hierarchy of Multimedia Objects

In a preferred embodiment, at least some abbreviations 115 are associated with a plurality of multimedia objects 116 arranged in a sequence or hierarchy. The hierarchy of multimedia objects 116 includes a set of variants of a core multimedia object 116 (not necessarily a particular single multimedia object 116), differing with regard to a set of parameters such as size, complexity, or detail.

For example, the typed word "flower" can comprise an abbreviation 115 and can be associated with a hierarchy of multimedia objects 116 representing flowers, including a stylized graphic of a flower, a relatively small photographic picture of a flower, a relatively large photographic picture of a flower, an animation of a flower, and an applet for emulating a flower (including being responsive to local weather reports).

When the operator enters the abbreviation 115, the client station 110 can offer the operator an opportunity to select among the hierarchy of multimedia objects 116 representing flowers. The client station 110 can also offer the operator an opportunity to alter the selection, either using a separate set of editing commands for the multimedia object 116, or using one or more abbreviations 115 associated with one or more of those editing commands.

For example, when the operator enters a particular multimedia object 116 using the typed word "flower", the client station 110 retains information about the properties of that multimedia object 116, including properties in the hierarchy of those multimedia objects 116 associated with that particular abbreviation 115. The client station 110 can alter the particular multimedia object 116 so as to select a different one of those multimedia objects 116 associated with that particular abbreviation 115.

Similarly, the client station 110 can replace the abbreviation 115 with the entire hierarchy of those multimedia objects 116, including a description of its set of properties, so that the entire hierarchy of those multimedia objects 116 is transmitted to the destination client station 110. The destination client station 110 can select one of those multimedia objects 116 associated with that particular abbreviation 115 for presentation, and can allow the operator of the destination client station 110 to alter the particular multimedia object 116 so as to select a different one of those multimedia objects 116 associated with that particular abbreviation 115.

In a preferred embodiment, the destination client station 110 can select one of those multimedia objects 116 associated with that particular abbreviation 115 in the following ways:

- The destination client station 110 can ask the operator of the destination client station 110 to choose one of those multimedia objects 116.
- The destination client station 110 can select one of those multimedia objects 116 responsive to capabilities of the client station 110.
- The destination client station 110 can select one of those multimedia objects 116 responsive to preferences known for the operator.
- The destination client station 110 can select one of those multimedia objects 116 responsive to actions by the operator, such as an amount of time the operator uses viewing that multimedia object 116. For example, the destination client station 110 can alter the selected multimedia object 116 to present more detail when the operator uses more time viewing that multimedia object 116.

Ensemble of Multimedia Objects

In any particular object, the set of individual multimedia objects 116 used therein is collected into an ensemble, which can itself have properties that can be modified. One such property of the ensemble is a "theme," which applies to a plurality of multimedia elements in the ensemble and presents a variant of each multimedia element consistent with the theme.

For example, in an ensemble of multimedia objects 116, those multimedia objects 116 representing flowers could each be represented as a picture of a cactus when the theme is a "Western" theme, or could each be represented as a picture of a rose when the theme is a "Romantic" theme. Similarly, in that same ensemble, those multimedia objects 116 representing hats could each be represented as a picture of a cowboy hat when the theme is a "Western" theme, or could each be represented as a picture of a helmet when the theme is a "Military" theme. Example themes could include an "Ancient" theme, a "Gothic" theme, a "Military" theme, a "Modern" theme, an "MTV" theme, a "Romantic" theme, a "Western" theme, or other themes known in art or literature.

Altering the theme for an ensemble would thus alter the presentation of each multimedia object 116 that is linked to the theme for that ensemble. The theme can also be associated with multimedia objects 116 that are not specifically entered using abbreviations 115, such as a background multimedia object 116 for the ensemble.

When the operator enters a particular data object that might include one or more multimedia objects 116, the client station 110 can offer the operator an opportunity to select a theme for that object. The client station 110 can also offer the operator an opportunity to alter the selection, either using a separate set of editing commands for the multimedia object 116, or using one or more abbreviations 115 associated with one or more of those editing commands.

When the operator enters a particular abbreviation 115, the client station 110 can select among the hierarchy of multimedia objects 116 to find one associated with the theme for the ensemble. The client station 110 can also offer the operator an opportunity to alter the selection so as to make that multimedia object 116 either more or less consistent with the theme, either using a separate set of editing commands for the multimedia object 116, or using one or more abbreviations 115 associated with one or more of those editing commands.

For example, when the operator enters a particular data object, such as an electronic chat message or an electronic mail message, the client station 110 retains information about the properties of that data object, including its theme. For each multimedia object 116 in the data object, the client station 110 retains information about whether that multimedia object 116 uses the global theme for the data object, or has a specific different theme.

Similarly, if the client station 110 can replace the abbreviation 115 with the entire hierarchy of those multimedia objects 116, the client station 110 can indicate which theme the abbreviation 115 is to be represented with. The destination client station 110 can select one theme for those multimedia objects 116 associated with that particular abbreviation 115 for presentation, and can allow the operator of the destination client station 110 to alter the theme, and so alter the presentation of that particular multimedia object 116.

In a preferred embodiment, the destination client station 110 can select the theme for each multimedia object 116 in the following ways:

- The destination client station 110 can use the theme indicated by the sending client station 110.
- The destination client station can ask the operator of the destination client station 110 to choose a theme.
- The destination client station 110 can select a theme responsive to known preferences of the operator of the destination client station 110.

Compression of Multimedia Objects

In an aspect of the invention, when the abbreviations 115, multimedia objects 116, and associations 117 are available both to the sending client station 110 and to the destination client station 110, data objects including multimedia objects 116 can be compressed when transmitting those data objects from the sending client station 110 to the destination client station 110.

In this aspect of the invention, the sending client station 110 examines a data object in a message (such as an electronic mail message or a web document) to be transmitted from the sending client station 110 to the destination client station 110. When the data object includes a particular multimedia object 116 for which there is an association 117 with a particular abbreviation 115, the sending client station 110 replaces that multimedia object 116 in the data object with its associated abbreviation 115. The data object is thereby compressed into a more compact form.

The sending client station 110 transmits the message, including the compressed data object, to the server station 120, which transmits the message, including the compressed data object, to the receiving client station 110. The receiving client station 110 examines the compressed data object in the message, replaces each abbreviation 115 with its associated multimedia object 116, and presents the message, including the original data object, to an operator.

In alternative embodiments, the multimedia objects 116 can be available at a remote device coupled to the network 130, and the receiving client station 110 can cache those multimedia objects 116 or obtain them as needed.

In alternative embodiments, the abbreviations 115 and the associations 117 can be transmitted with the message and the compressed data object.

Behavior Associated with Abbreviations

Each multimedia object 116 can include a program fragment, such as a Java applet, a CGI script for accessing a local database, or a URL for accessing a remote data object. More generally, each abbreviation 115 can be associated with a sequence of behavior, such as performed by executing a Java applet as the associated multimedia object 116.

For example, an abbreviation such as the typed word "sales" could be associated with a multimedia object 116 including a Java applet or CGI script for accessing a local database, retrieving a value for total sales, and inserting that value into the data object in which the abbreviation 115 is found.

In a preferred embodiment, a library includes such abbreviations 115, multimedia objects 116 including program fragments, and associations 117; and that library is available at the client station 110 or at a remote device coupled to the network 130.

Method of Operation

Figure 2:
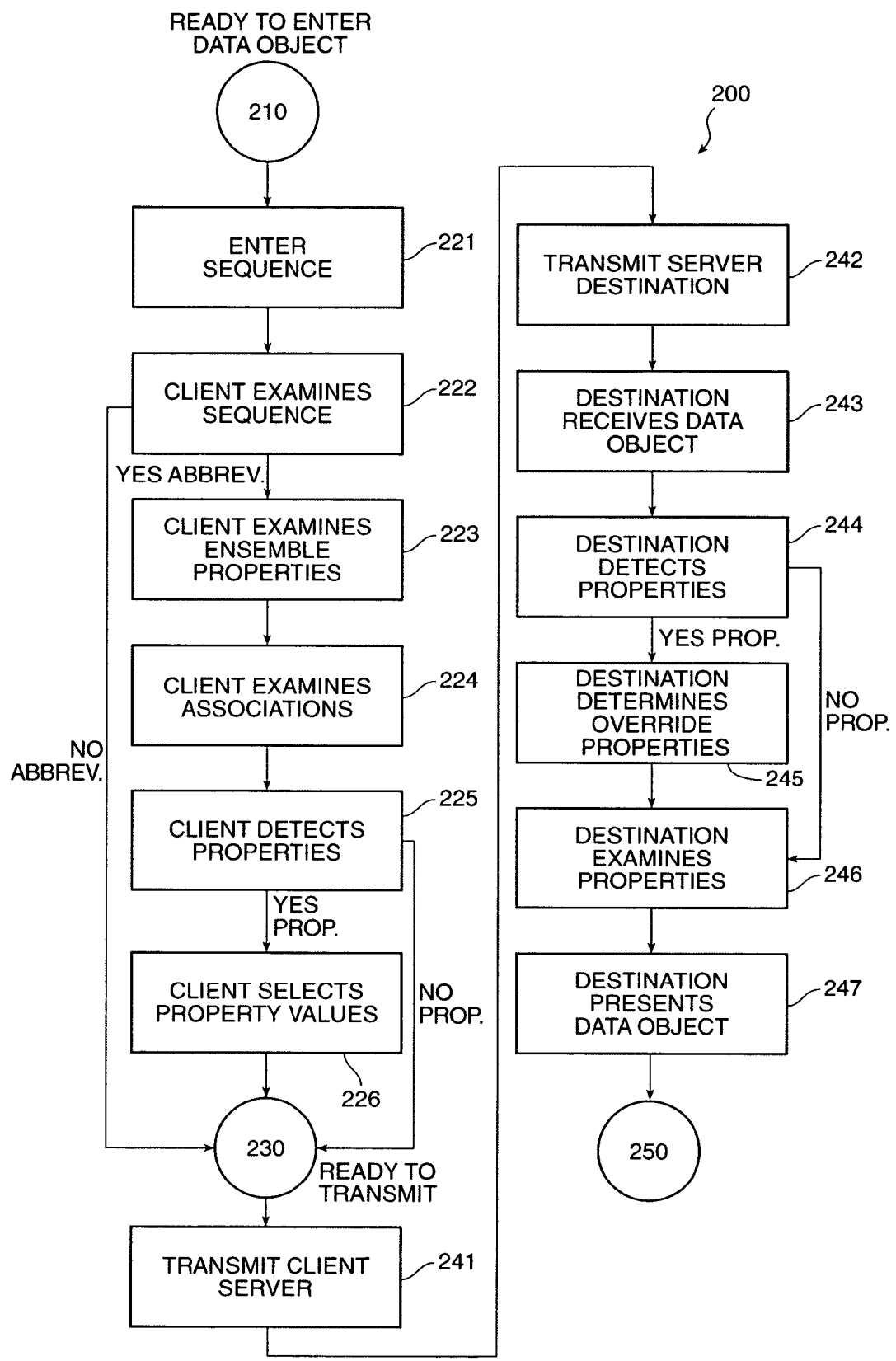
FIG. 2 shows a flow diagram of a method for multimedia communication and presentation.

FIG. 2 shows a flow diagram of a method for multimedia communication and presentation.

A method 200 includes a set of flow points to be noted, and steps to be executed, cooperatively by the system 100, including the sending client station 110, the server station 120, and the destination client station 110.

At a flow point 210, an operator at a particular client station 110 is ready to enter a data object intended to include multimedia objects 116 for communication or presentation. The data object can comprise an electronic chat message, an electronic mail message, a file object, a web document, or another type of data object known in the disparate arts of computer science.

For example, the data object can comprise an electronic chat message being composed at a keyboard in real time.

At a step 221, the operator at the client station 110 enters a sequence of keystrokes and mouse actions, such as using a text editor or similar application program for entry of text objects.

For example, the operator at the client station 110 can type a sequence of printable text characters.

At a step 222, the client station 110 examines the sequence of keystrokes and mouse actions, and examines its database 114, so as to detect and locate any abbreviations 115 in the entered sequence of keystrokes and mouse actions.

For example, a particular abbreviation 115 can comprise the typed word "flower".

If the client station 110 detects any abbreviations 115, it continues with the next step. Otherwise, it continues with the flow point 230.

At a step 223, the client station 110 examines the properties of any associated ensemble of multimedia objects 116, and determines whether any such properties affect presentation of any multimedia objects 116 associated with the detected abbreviations 115. In particular, the client station 110 determines if there is a theme associated with any such ensemble, and further determines if any such theme affects presentation of any multimedia objects 116 associated with the detected abbreviations 115.

For example, if the data object has an associated theme and the theme is a "Western" theme or a "Romantic" theme, the client station 110 determines that the theme would affect presentation of a multimedia object 116 associated with the abbreviation 115 the typed word "flower" (such as to select a picture of a cactus or a rose, respectively).

At a step 224, the client station 110 examines the associations 117 in the database 114, and replaces the detected abbreviations 115 with associated multimedia objects 116.

For example, the client station 110 could replace the typed word "flower" with a picture representing a flower.

At a step 225, the client station 110 determines if the associated multimedia objects 116 have properties to be determined which affect presentation or which select among multiple associated multimedia objects 116 in a hierarchy.

For example, the picture representing a flower can have a property "detail" which distinguishes among a stylized graphic of a flower, a relatively small photographic picture of a flower, a relatively large photographic picture of a flower, an animation of a flower, and an applet for emulating a flower.

If the client station 110 detects any properties to be determined, it continues with the next step. Otherwise, it continues with the flow point 230.

At a step 226, the client station 110 selects values for the properties of the multimedia objects 116. In a preferred embodiment, these values can be overridden by an operator at the client station 110 or at the destination client station 110.

Similar to the steps 222 through 226, the sending client station 110 can detect multimedia objects 116 with associated abbreviations 115 and replace those multimedia objects 116 with their associated abbreviations 115 (and associated properties), so as to compress the data object.

At a flow point 230, the data object is ready for transmission from the sending client station 110 to one or more destination client stations 110.

At a step 241, the sending client station 110 transmits the data object to the server station 120 using the network 130 and a known transmission protocol.

For example, the server station 120 can comprise an electronic chat server and the known transmission protocol can comprise an electronic chat transmission protocol. Similarly, the server station 120 can comprise an electronic mail server and the known transmission protocol can comprise an electronic mail transmission protocol.

At a step 242, the server station 120 transmits the data object to the destination client station 110 using the network 130 and the known transmission protocol.

In alternative embodiments, the server station 120 may perform steps similar to the steps 222 through 226, so as to replace abbreviations 115 known to the server station 120 with associated multimedia objects 116, or to replace multimedia objects 116 known to the server station 120 with associated abbreviations 115 (and associated properties).

In alternative embodiments, the sending client station 110 may transmit the data object directly to the destination client station 110 using the network 130 and the known transmission protocol.

At a step 243, the destination client station 110 receives the data object and its included multimedia objects 116.

At a step 244, similar to the step 225, the destination client station 110 determines if the associated multimedia objects 116 have properties to be determined which affect presentation or which select among multiple associated multimedia objects 116 in a hierarchy.

If the destination client station 110 detects any properties to be determined, it continues with the next step. Otherwise, it continues with the step 246.

At a step 245, similar to the step 226, the destination client station 110 determines if it should override values for the properties of the multimedia objects 116, such as if directed to by an operator at the destination client station 110.

At a step 246, similar to the step 223, the destination client station 110 examines the properties of any associated ensemble of multimedia objects 116, determines if there is a theme associated with any such ensemble, and further determines if it should override that theme, such as if directed to by an operator at the destination client station 110.

At a step 247, the destination client station 110 presents the data object and its included multimedia objects 116.

At a flow point 250, the data object has been received and presented to an operator at one or more destination client stations 110.

Alternative Embodiments

Although preferred embodiments are disclosed herein, many variations are possible which remain within the concept, scope, and spirit of the invention, and these variations would become clear to those skilled in the art after perusal of this application.

The invention claimed is:

1. A method, comprising the steps of:
receiving a set of sequences of keystrokes, mouse actions, or keystrokes and mouse actions;
detecting whether a mnemonic name is present in said sequences of keystrokes, mouse actions, or keystrokes and mouse actions, said mnemonic name being associated with one of a set of multimedia objects;
when said mnemonic name is detected in said set of sequences, replacing said mnemonic name with said one multimedia object in said set of sequences; and
wherein said set of multimedia objects are associated with an ensemble, said ensemble having a set of ensemble properties.

2. A method as in claim 1, wherein said ensemble properties are effective to select among a set of alternative multimedia objects for each multimedia object in said set of multimedia objects.

3. A method as in claim 1, wherein said ensemble properties include a theme, said theme being effective to select, for each multimedia object in said ensemble, one multimedia object from a set of multimedia objects associated with said theme.

4. A method as in claim 1, wherein said ensemble properties are editable in response to a set of editing abbreviations.

5. A method as in claim 4, wherein each said editing abbreviation comprises a relatively short sequence of keystrokes or mouse actions.

6. A method as in claim 1, further comprising the steps of:
communicating at least one of said ensemble properties to a recipient with an electronic chat message or an electronic mail message; and
presenting said multimedia object to said recipient in accordance with said at least one of said ensemble properties.

7. A method as in claim 6, further comprising the step of conditionally overriding at least one of said ensemble properties in response to a capability of said recipient's presentation device, whereby said multimedia object is presented to said recipient in accordance with a different at least one of said ensemble properties.

8. A method as in claim 6, further comprising the step of conditionally overriding at least one of said ensemble properties in response to an action by said recipient, whereby said multimedia object is presented to said recipient in accordance with a different at least one of said ensemble properties.

9. A method as in claim 8, wherein said action includes time taken by said recipient to review the multimedia object.

10. A system, comprising:
a database having a set of mnemonic names, each associated with at least one corresponding multimedia object;
an input device for a set of sequences of keystrokes, mouse actions, or keystrokes and mouse actions;
a detector capable of detecting at least one of said mnemonic names in said set of sequences and of replacing said mnemonic name with at least one corresponding multimedia object in said set of sequences; and
an associating mechanism capable of associating an ensemble with a set of said multimedia objects, said ensemble having a set of ensemble properties;
wherein each said multimedia object has a set of editable properties.

11. A system as in claim 10, wherein said ensemble properties are effective to select among a set of alternative multimedia objects for each multimedia object in said set of multimedia objects.

12. A system as in claim 10, wherein said ensemble properties include a theme, said theme being effective to select, for each multimedia object in said ensemble, one multimedia object from a set of multimedia objects associated with said theme.

13. A system as in claim 10, wherein said ensemble properties are editable in response to a set of editing abbreviations.

14. A system as in claim 13, wherein each said editing abbreviation comprises a relatively short sequence of keystrokes or mouse actions.

15. A system as in claim 10, further comprising:
a communicating mechanism capable of sending at least one of said ensemble properties to a recipient with an electronic chat message or an electronic mail message; and
a presentation mechanism capable of presenting said multimedia objects to said recipient in accordance with said at least one of said ensemble properties.

16. A system as in claim 15, further comprising a mechanism capable of conditionally overriding at least one of said ensemble properties in response to a capability of said recipient's presentation device, whereby said multimedia objects are presented to said recipient in accordance with a different at least one of said ensemble properties.

17. A system as in claim 15, further comprising a mechanism capable of conditionally overriding at least one of said ensemble properties in response to an action by said recipient, whereby said multimedia objects are presented to said recipient in accordance with a different at least one of said ensemble properties.

18. A system as in claim 17, wherein said action comprises time taken by said recipient to review the multimedia objects.

* * * * *